(No Model.)
J. C. F. DICK.
TWO WHEELED VEHICLE.
No. 565,201.  Patented Aug. 4, 1896.
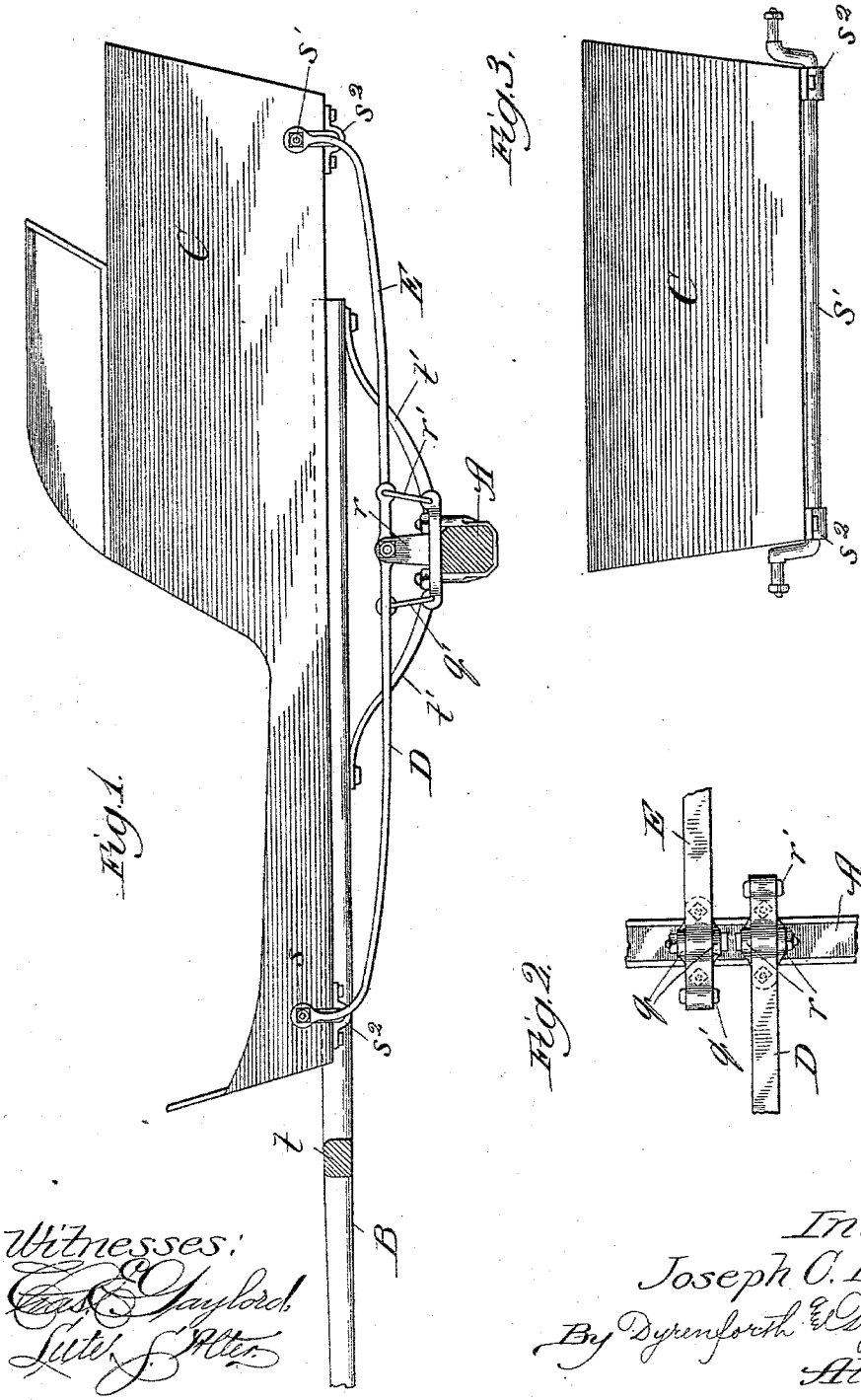
Witnesses:
Chas. E. Gaylord
Lute J. Alter
Inventor:
Joseph C. F. Dick,
By Dyrenforth & Dyrenforth
Attys.
THE NORRIS PETERS CO., PHOTO-LITHO., WASHINGTON, D. C.

UNITED STATES PATENT OFFICE.

JOSEPH C. F. DICK, OF KENWOOD, CALIFORNIA.

TWO-WHEELED VEHICLE.

SPECIFICATION forming part of Letters Patent No. 565,201, dated August 4, 1896.

Application filed March 6, 1896. Serial No. 582,036. (No model.)

*To all whom it may concern:*

Be it known that I, JOSEPH C. F. DICK, a citizen of the United States, residing at Kenwood, in the county of Sonoma and State of California, have invented a new and useful Improvement in Two-Wheeled Vehicles, of which the following is a specification.

My invention relates to improvements in two-wheeled vehicles, such as road-carts, my object being to provide a cart having a body so mounted upon the axle that it will be cushioned against any jarring motion and free from the objectionable horse motion present in all other constructions of two-wheeled carts of which I am aware.

I carry out my invention by mounting the box or body of the vehicle upon springs supported altogether by the axle and without direct connection with the thills. The springs are of a special and improved construction, having a hinged connection with the axle and also with the cart-body, whereby the rocking of the axle in the movement of the horse is neutralized before it reaches the cart-body.

In the drawings, Figure 1 is a broken section of a cart, showing the box or cart-body in side elevation and my improvements in position; Fig. 2, a broken plan view of the axle and illustrating the manner in which I attach the supporting-springs for the cart-body, and Fig. 3 an end elevation of the cart-body.

A is an axle, on which the wheels are mounted in the usual way.

B represents the thills, connected together in front of the box by a cross-bar $t$ and mounted at their rear ends upon brackets $t'$, secured to the axle.

C is the box or cart-body mounted between the thills B.

On the forward and rear end portions of the box, at the under side of the latter, are crank-rods $s$ $s'$, respectively, pivotally secured in bearings $s^2$ $s^2$ and having crank ends beyond opposite sides of the box.

D is one of a pair of forward-projecting supporting springs pivotally connected at their forward ends to the crank ends of the rod $s$ and pivotally mounted near their rear ends upon clips $r$, which are secured to the axle. Pivotally fastened to the rear ends of the springs D are links $r'$, at their opposite ends pivotally secured to the axle, preferably at the bases of the clips $r$.

E is one of a pair of rear or backward extending body-supporting springs pivotally connected at one end to the crank ends of the rod $s'$, and toward their opposite or forward ends pivotally mounted upon clips $q$, like the clips $r$, and fastened to the axle in a similar way. Pivotally connected with the forward ends of the springs E are links $q'$, at their opposite ends pivotally secured to the axle, preferably at the bases of the clips $q$. The link connections between the short ends of the springs D E and the axle are such that the springs may swing to a limited extent upon their pivots at the clips $r$ $q$, and the crank-rods $s$ $s'$ permit the springs to have a limited longitudinal play independent of the cart-body, due to the turning of the crank-rods in their bearings $s^2$.

The springs D E should in practice be sufficiently stiff to hold the body or box well up above the axle under any weight which the cart in practice may have to carry. Any jarring motion given to the wheels as they travel over a rough road will be neutralized largely by the springs D E. Under the motion of a horse in trotting the axle A will be oscillated to a limited extent, and this oscillating motion will be taken up largely by the swinging of the springs on their pivots at the clips $r$ $q$ and the rocking motion given by the springs to the crank-rods.

It has been usual hitherto to connect the cart-body, either rigidly or by means of springs, with the thills. Such connection has always been objectionable for the reason that the up-and-down motion of the thills, under the movement of the horse, gives to the forward end portion, particularly of the box, a short jerky motion which the springs, when of a sufficient stiffness to support the box, cannot neutralize. In fact, when springs are thus applied, under each rise and fall of the thills in the movement of the horse two or three short jerky motions are given to the box instead of one comparatively long motion. In my improved construction the springs are attached only at the axle, where the rocking motion is but slight as compared with the motion of the thills, and being pivoted upon the axle, as described, the rocking movement of the latter is not necessarily imparted to the springs. Their pivotal connection with the crank-rods *s s'* tends to cause the springs under any longitudinal thrust, due to the rocking of the axle, to swing the crank-rods in their bearings without jarring the box-body.

As the result of my improvements I provide a particularly easy-riding two-wheeled cart, free from the objections hitherto urged against carts of this type.

If desired, the links *r' q'* may be strips of leather or the like flexible material, to give greater pivotal play to the springs upon their supporting-clips. I believe that the springs D E, constructed as described, give the best results. Nevertheless any construction of springs, pivotally connected with the axle and cart-body and tending at their pivots to neutralize the horse motion at the axle, could be substituted for the front or rear set of the springs shown.

While I prefer to construct my improvements in every way as shown and described, they may be modified in the matter of details of construction without departing from the spirit of my invention as defined by the claims.

What I claim as new, and desire to secure by Letters Patent, is—

1. In a two-wheeled cart, the combination with the axle and cart-body, of a spring fulcrumed adjacent to one end upon the axle, and a link pivotally connected to the axle and to the adjacent end of the spring, and operating to limit the turning of the spring on its fulcrum, the spring at its end portion, opposite to the end at which it is mounted as described, being pivotally connected to the end portion of the cart-body, substantially as and for the purpose set forth.

2. In a two-wheeled cart, the combination with the axle and cart-body, of a clip upon the axle, a spring pivotally mounted adjacent to one end upon said clip, and a link pivotally connected to the axle and to the adjacent end of the spring, and operating to limit the turning of the spring upon its fulcrum, the spring at its free end portion being pivotally connected to an end portion of the cart-body, substantially as and for the purpose set forth.

3. In a two-wheeled cart, the combination with the axle and cart-body, of clips upon the axle, springs pivotally mounted adjacent to one end upon said clips, links pivotally connected with the axle, and with the springs at the ends thereof adjacent to the clips, cranks upon the cart-body toward the front and rear ends thereof, the springs at their ends opposite to the ends at which they are mounted as described being pivotally connected to said cranks and forming the sole support of the cart-body, substantially as described.

JOSEPH C. F. DICK.

In presence of—
C. T. HAHMANN,
M. J. HAHMANN.